Feb. 28, 1956  E. P. WISE  2,736,139
METHOD OF CONTROLLING SEED GERMINATION
BY MEANS OF A COMPOSITE SEED ASSEMBLY
Filed Dec. 18, 1952
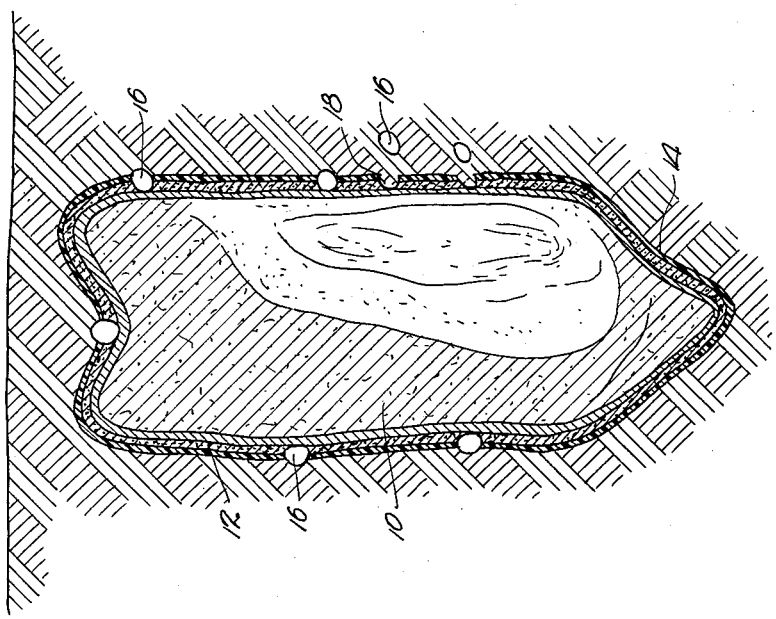
Fig. 2.
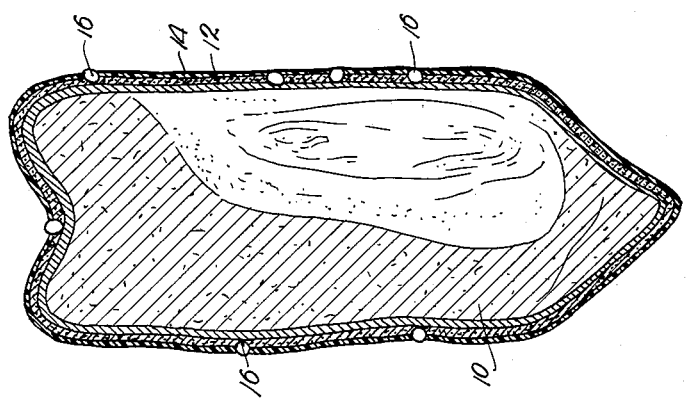
Fig. 1.
INVENTOR.
Eugene P. Wise
BY
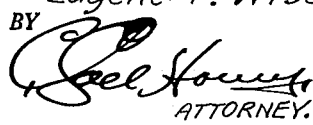
ATTORNEY.

United States Patent Office 2,736,139
Patented Feb. 28, 1956

2,736,139

METHOD OF CONTROLLING SEED GERMINATION BY MEANS OF A COMPOSITE SEED ASSEMBLY

Eugene P. Wise, Kansas City, Kans.

Application December 18, 1952, Serial No. 326,755

8 Claims. (Cl. 47—58)

This invention relates to the art and science of crop and plant production, and particularly to the branch of applied agronomy dealing with seed germination, the primary object being to provide controlled propagation as a means of increasing the use of plant life to mankind.

It is the most important object of this invention to provide for seed treatment that will protect the seed so treated agains deterioration, and especially from germination after planting until weather conditions have heated the soil to a predetermined temperature.

The present invention is particularly adapted as an aid in the production of corn, one of the most valuable agricultural products. It has a longer season of growth than most other stable crops, requiring from four to six months in which to mature, and therefore its range in latitude is relatively low. For its highest production, corn requires warm, deep and loamy soils with plenty of moisture. The plant is therefore indigenous to the great corn belt having a warm climate with long summers. However, the critical period is in July and August during which the rainfall determines largely the season's yield.

Planting time is therefore an important factor and should not precede a sufficient warmth in the soil to germinate the seed quickly. While the time varies in different localities, a wet cold soil will rot the seed. On the other hand, when planting is too late, shortage of rainfall frequently occurs during tasselling and formation of ears, resulting in diminished yield.

Plowing for corn is done in fall, winter or spring, but whether by hill or drill planting, check-rowing, or listing in furrows, the producer is oftentimes confronted with adverse weather conditions, preventing early planting at the time when the soil is most favorable for rapid germination so far as warmth and moisture are concerned.

Heavy rainfall in the spring prevents working the field and late planting usually results in immature corn at the end of the growing season. When it finally becomes possible to plant the seed, lack of additional rainfall prevents rapid early growth and the plant is unable to withstand the heat and dryness of midsummer.

It follows therefore that if the seed could be treated to withstand deterioration in the soil and be protected against germination until the soil becomes favorable as to warmth and moisture, fall planting could be done and the seed would germinate quickly in the spring at the proper time regardless of whether or not the fields could be worked with agricultural implements. Fall plowing and planting, together with winter freezing and thawing would present a loose and friable soil particularly advantageous for successful production of this crop.

Additionally, rotation of crops, planting of leguminous crops, and addition of fertilizers must be practiced for corn to succeed. Phosphorus added to the soil or use of fertilizer having phosphoric acid as its chief ingredient promotes an increased yield. Other necessary plant foods include substances containing carbon, hydrogen, oxygen and nitrogen, together with sulphur, iron and other mineral matter. Except for the carbonaceous food, the other food items must be obtained for the most part from the water and mineral salts in the soil.

In carrying out the present invention therefore it is also important to consider supplying the seed with food to be brought in solution by water in the soil and subsequent absorption by the roots of the plant.

Accordingly, it is the object of this invention to provide a composite seed assembly that includes a plurality of secondary plant seeds culstered about a primary plant seed through use of a substance that will not disintegrate over long periods of time when the seed assembly is planted and thereby subjected to the soil and the moisture therein.

Another object hereof is to apply a substance to the primary seed that is highly resistant to acids, alkalies, moisture, fungus and mildew, and which, when the secondary seeds germinate will provide access openings for passage of moisture to the primary seed for promoting germination of the latter.

Other objects include the way in which the mother seed is provided with a hygroscopic coating to assure filming of moisture around the coated seed after germination of the secondary seeds: the manner of supplying food for the primary seed from the time it commences to germinate by selection of a proper hygroscopic substance; the way in which the primary seed is protected against insect attack from the beginning of the process of germination; and many additional objects, all of which will be made clear as the following specification progresses, reference being had to the accompanying drawing, wherein:

Figure 1 is a longitudinal cross-sectional view through a kernel of corn, showing the same treated in accordance with the method of the present invention; and Fig. 2 is a similar view showing the treated kernel at its initial stage of germination in the soil.

Since the present invention is adapted to promote the growth of virtually any flowering or seed plant, i. e. the entire field of trees and field and garden plants which develop a seed, it is to be understood that reference herein made to corn and lespedeza is for illustrative purposes only so as to afford a clear understanding of the method involved and the nature of the composite seed assembly produced by such method.

It is generally recognized that the first act of growth by an embryo plant is caused by the presence of moisture and atmospheric air, with an elevation of temperature above 32° F. The integuments of the seed are softened and the tissue of the embryo is relaxed by moisture. Oxygen and nitrogen are supplied by atmospheric air and the vitality of the embryo is excited by the temperature rise. As the chemical constituents of the seed change during germination, there is an accompanying increase in temperature. A root is produced which strikes downwardly, fixes itself in the soil and begins to absorb food. And, an upward growth commences, providing a stem and leaves.

The primary or "mother" seed 10 is preferably, though not necessarily, first coated with a substance 12 that is not only a fertilizer or plant food, but which is capable of readily absorbing and retaining moisture, and operable as a fungicide and/or insecticide, or at least adapted as an insect repellant. Of these characteristics, the hygroscopic properties of the coating 12 are vastly more important to the present invention than fertilization, ability to destroy or inhibit the growth of fungi, or aversion to attack by insect life. Thus, any moisture sensitive material, preferably one which is stable when dry, may be used.

Thereupon the coating 12 is covered with a naturally adhesive fast-drying composition to present a thin film 14 thereon, the composition then being dried or permitted to dry until tacky, whereupon a plurality of secondary plant seeds 16 are placed in the film 14 as shown in the drawing. After the film 14 has obtained a hard through dry, the seeds 16 will be firmly attached to and clustered about the seed 10, presenting a composite seed assembly ready for storage or planting.

Particularly good results can be obtained if coating 12 is to be used by employing a saturated solution of approximately 75% sucrose and 25% magnesium sulfate.

Sucrose is extremely useful in carrying out the process because it has a very great affinity for water and attracts moisture strongly from its surroundings. It may be easily and quickly dissolved to facilitate application to the seed and, since the moisture of the solution can be removed rapidly by any simple drying step, it will crystallize and cake on the surfaces of the primary seed 10.

Another important consideration in the selection of a suitable coating 12 is to avoid the uses of substances which will have deleterious effects on the seed while it is to remain dormant during storage or in the soil. Sucrose is incapable of decomposing the seed and is particularly ineffective in penetrating, breaking down or uniting with the outer covering of seed 10 in absence of heat or moisture. Notwithstanding its hygroscopic properties, it has been found that sucrose will not draw the moisture from within the seed 10 to destroy the embryo.

Since sucrose includes a rather large number of varying compounds of carbon, hydrogen and oxygen, it is seen further that it provides an excellent plant food and is particularly valuable in enhancing embryo development, formation of strong, hearty roots, and early plant growth.

Insecticidal and fungicidal properties may be provided in the coating 12, if desired, in many ways, and to this end, sulphate of magnesium is very satisfactory, again because of its solubility, ability to crystallize and cake around the seed 10, stability while dry, excellence as a plant food, and absence of undesirable effects on the seed itself, not only prior to germination but during the various stages of plant and root development. Since magnesium, hydrogen and oxygen are extremely valuable as plant foods, it is used extensively in fertilizers and of course, sulfuric acid itself is also a well-known product for making fertilizers.

After the coating 12 has dried, and therefore crystallized on the seed 10 in the form of a cake by virtue of its adhesive properties, the substance for producing film 14 is sprayed or otherwise applied to completely cover coating 12. While many compositions are suitable for the purposes of this invention, it has been found that shellac, lacquer, and other resinous substances give good results. There are a rather large number of synthetic resins on the market today, particularly those having an acrylic base which are suitable for the purposes hereof.

A proprietary product in the nature of a synthetic resin of the acrylic ester type, called "Krylon" has properties that are ideally suited for providing the type of film 14 that is desired. This clear acrylic spray is a wear resistant, air-dry coating that becomes tack free in about eight minutes and obtains a hard through dry in about 4 hours.

It has natural adhesive properties, is highly resistant to acids and alkalies and is capable of sealing any article coated therewith against admission of air, water and dirt. Its high resistance to fungus and mildew growth renders the same well suited for the purposes of this invention. It is a solventless, fire retarding material, will not soften below 180 degress F., has a very good impact resistance, its flexibility is excellent, and the film will remain stable over long periods of storage.

While all of the above characteristics may not be deemed critical by those following this invention, they are desirable for best results and it can be appreciated that there are many other compositions, both natural and synthetic, having the essential properties for successful carrying out of the invention.

While the film 14 is still tacky, the seeds 16 are placed therein in such manner as to expose a portion thereof to the seed 10 and/or coating 12 with a portion thereof also exposed to the atmosphere as shown in Fig. 1. This step may be carried out in any suitable manner and some degree of force should be applied to assure the seeds 16 penetrating the film 14.

Assuming the seed 10 to be corn and the seeds 16 to be lespedeza, the composite assembly may be planted in the fall, where it will remain dormant until the soil becomes sufficiently warm to cause germination of the lespedeza seeds 16. Seeds 16 will swell as much as 100% and either crack the coating 12 or actually "pop" out as shown in Fig. 2, presenting a number of small openings 18 in film 14 for ingress of moisture.

The sucrose in coating 12 will very effectively and quickly absorb the outside moisture, and by capillary action, qiuckly subject the entire surface of seed 10 to decomposition, whereupon the process of germination commences in the usual manner by the action of the moisture that has penetrated the shells of the seed 10. With the evolution of heat in the seed 10, various changes take place in the chemical constituents of the seed 10, a root is produced and upward growth commences almost immediately.

It may be appreciated therefore that since the capillary phenomena occurs equally in air and in vacuo, it is unnecessary to expose the entire seed 10 to the surrounding soil since any minute opening, which will permit the sucrose to attract moisture, is sufficient to start the process of absorption, the resultant softening of the integuments of the seed 10, and the excitation of the vitality of the embryo thereof. The molecular actions which take place between the particles of water itself and between such liquid and the solids making up coating 12 soon form a thin layer or film, completely surrounding the seed 10 which is at once absorbed by the porous tissues of the seed 10.

It follows therefore that by providing a protective film 14 for the seed 10 and the hygroscopic material 12 thereon, the absorbing action of the coating 12 may be delayed. And, by providing means to permit penetration of moisture through the protective film 14 to the coating 12 when germination is desired, the objects of this invention can be fully realized.

This invention is to be distinguished over the art of coating seeds to provide pellets of predetermined uniform size and shape suitable for use in planting machines. The field of disease prevention and avoidance of fungus or mildew growth through coatings of various types, is also crowded. In these fields the coatings are selected from materials that would not remain hard enough to repel water and thereby retard or prevent germination. Conversely, it is the purpose hereof to avoid complete coverage of the primary seed by the water retarding film 14 but to permit the secondary seeds to expand on germination and thereby subject the hydrogscopic coating 12 to the moisture whereby a film forms on the seed 10. The film 14 is actually not a coating of itself but cooperates with the seeds 16 in covering the seed 10.

The corn and lespedeza combination has been herein set forth by way of example only because of the problem of early spring planting is most apparent in the corn belt, and lespedeza is peculiarly suitable since it will not germinate until the soil becomes sufficiently warm. Lespedeza is usually drilled about two weeks before the last expected spring frost, ranging from mid-February in the South to mid-April farther north. Commencement of corn planting is as early as the first of February in Southern Texas and as late as May 20th along the Canadian border. Thus, by planting the heed cluster hereof, there is an assurance of early corn germination whether or not the fields can be tilled, yet not too early to endanger the young corn plant to freezing because the lespedeza seeds will remain dormant until the soil becomes warm.

Such crops as Bermuda grass, blue grass, millet, sorghum such as kafir, milo and sorgo, cowpea, broom corn, Sudan grass, and many others having warm weather growth habits, as well as any of the various legumes, may be substituted for lespedeza as desired. Spring wheat, oats and barley, together with flax, sweet clover and soybeans are examples of other crops that should be sowed as early in the spring as possible and are adapted for treatment with secondary seeds in the manner hereinabove set forth.

Having thus described the invention, what is claimed as new and desired to be secured by Letters Patent is:

1. A method of preventing germination of a primary plant seed until the soil in which it is planted rises to a predetermined temperature, said method including the steps of coating the primary plant seed with a fast-drying, naturally adhesive composition, incapable of ready disintegration when dry and hard; drying the composition until the same is tacky; placing a plurality of secondary plant seeds in the tacky composition on the primary plant seed characterized by an incapability of germination at temperatures below said predetermined temperature, with the secondary plant seeds partially exposed to the primary plant seed and partially exposed to the atmosphere; and drying the composition until hard, whereby the same attaches the secondary plant seeds to the primary plant seed.

2. A method of preventing germination of a primary plant seed until the soil in which it is planted rises to a predetermined temperature, said method including the steps of coating the primary plant seed with a hydroscopic substance; coating said substance with a fast-drying, naturally adhesive composition, in capable of ready disintegration when dry and hard; drying the composition until the same is tacky; placing a plurality of secondary plant seeds in the tacky composition on the primary plant seed characterized by an incapability of germination at temperatures below said predetermined temperature, with the secondary plant seeds partially exposed to said substance and partially exposed to the atmosphere; and drying the composition until hard, whereby the same attaches the secondary plant seeds to the primary plant seed.

3. A method of preventing germination of a primary plant seed until the soil in which it is planted rises to a predetermined temperature, said method including the steps of coating the primary plant seed with a hygroscopic solution capable of crystallization on the primary seed and adherence thereto when dry; drying the solution until the same forms into crystals attached to the primary plant seed; coating the primary plant seed and the crystals thereon with a fast-drying, naturally adhesive composition incapable of ready disintegration when dry and hard; drying the composition until the same is tacky; placing a plurality of secondary plant seeds in the tacky composition on the primary plant seed characterized by an incapability of germination at temperatures below said predetermined temperature, with the secondary plant seeds partially exposed to said crystals and partially exposed to the atmosphere; and drying the composition until hard, whereby the same attaches the secondary plant seeds to the primary plant seed.

4. A method of preventing germination of a primary plant seed until the soil in which it is planted rises to a predetermined temperature, said method including the steps of coating the primary plant seed with a saturated solution of 25% magnesium sulfate and 75% sucrose; drying the solution until the same forms into crystals attached to the primary plant seed; coating the primary plant seed and the crystals thereon with a fast-drying, naturally adhesive composition incapable of ready disintegration when dry and hard; drying the composition until the same is tacky; placing a plurality of secondary plant seeds in the tacky composition on the primary plant seed characterized by an incapability of germination at temperatures below said predetermined temperature, with the secondary plant seeds partially exposed to said crystals and partially exposed to the atmosphere; and drying the composition until hard, whereby the same attaches the secondary plant seeds to the primary plant seed.

5. A method of producing a composite seed assembly comprising the steps of coating a primary plant seed with a fast-drying, naturally adhesive composition, incapable of ready disintegration when dry and hard; drying the composition until the same is tacky; placing a plurality of secondary plant seeds in the tacky composition on the primary plant seed with the secondary plant seeds partially exposed to the primary plant seed and partially exposed to the atmosphere; and drying the composition until hard, whereby the same attaches the secondary plant seeds to the primary plant seed.

6. A method of producing a composite seed assembly comprising the steps of coating a primary plant seed with a hygroscopic substance; coating said substance with a fast-drying, naturally adhesive composition, incapable of ready disintegration when dry and hard; drying the composition until the same is tacky; placing a plurality of secondary plant seeds in the tacky composition on the primary plant seed with the secondary plant seeds partially exposed to said substance and partially exposed to the atmosphere; and drying the composition until hard, whereby the same attaches the secondary plant seeds to the primary plant seed.

7. A method of producing a composite seed assembly comprising the steps of coating a primary plant seed with a hygroscopic solution capable of crystallization on the primary seed and adherence thereto when dry; drying the solution until the same forms into crystals attached to the primary plant seed; coating the primary plant seed and the crystals thereon with a fast-drying, naturally adhesive composition incapable of ready disintegration when dry and hard; drying the composition until the same is tacky; placing a plurality of secondary plant seeds in the tacky composition on the primary plant seed with the secondary plant seeds partially exposed to said crystals and partially exposed to the atmosphere; and drying the composition until hard, whereby the same attaches the secondary plant seeds to the primary plant seed.

8. A method of producing a composite seed assembly comprising the steps of coating a primary plant seed with a saturated solution of 25% magnesium sulfate and 75% sucrose; drying the solution until the same forms into crystals attached to the primary plant seed; coating the primary plant seed and the crystals thereon with a fast-drying, naturally adhesive composition incapable of ready disintegration when dry and hard; drying the composition until the same is tacky; placing a plurality of secondary plant seeds in the tacky composition on the primary plant seed with the secondary plant seeds partially exposed to said crystals and partially exposed to the atmosphere; and drying the composition until hard, whereby the same attaches the secondary plant seed to the primary plant seed.

References Cited in the file of this patent

UNITED STATES PATENTS

| | | |
|---|---|---|
| 1,125,457 | Buckley | Jan. 19, 1915 |
| 1,319,157 | Lingle | Oct. 21, 1919 |
| 1,482,473 | Lord | Feb. 5, 1924 |
| 2,083,065 | Heyl | June 8, 1937 |
| 2,143,468 | Avery | Jan. 10, 1939 |
| 2,648,165 | Nestor | Aug. 11, 1953 |

FOREIGN PATENTS

| | | |
|---|---|---|
| 86,393 | Austria | Nov. 25, 1921 |

OTHER REFERENCES

Country Gentleman, vol. 5, No. 17, page 262 (April 26, 1855).

Life, vol. 25, No. 16, pages 85, 86, 89 (October 18, 1948).